US009727387B2

(12) United States Patent
Crudele et al.

(10) Patent No.: US 9,727,387 B2
(45) Date of Patent: *Aug. 8, 2017

(54) SYSTEM MANAGEMENT AND MAINTENANCE IN A DISTRIBUTED COMPUTING ENVIRONMENT

(71) Applicant: International Business Machines Corporation, Armonk, NY (US)

(72) Inventors: Michele Crudele, Rome (IT); Gaetano Ferrari, Rome (IT); Bernardo Pastorelli, L'Aquila (IT)

(73) Assignee: International Business Machines Corporation, Armonk, NY (US)

( * ) Notice: Subject to any disclaimer, the term of this patent is extended or adjusted under 35 U.S.C. 154(b) by 331 days.

This patent is subject to a terminal disclaimer.

(21) Appl. No.: 14/536,787

(22) Filed: Nov. 10, 2014

(65) Prior Publication Data

US 2016/0134504 A1    May 12, 2016

(51) Int. Cl.

| G06F 15/173 | (2006.01) |
|---|---|
| G06F 9/50 | (2006.01) |
| H04L 12/911 | (2013.01) |
| H04L 29/08 | (2006.01) |
| H04L 12/26 | (2006.01) |

(52) U.S. Cl.
CPC .......... *G06F 9/5077* (2013.01); *H04L 43/045* (2013.01); *H04L 43/0817* (2013.01); *H04L 47/822* (2013.01); *H04L 67/16* (2013.01); H04L 43/067 (2013.01); H04L 67/1097 (2013.01)

(58) Field of Classification Search
None
See application file for complete search history.

(56) References Cited

U.S. PATENT DOCUMENTS

| 8,706,798 B1 | 4/2014 | Suchter et al. | |
|---|---|---|---|
| 2002/0152301 A1* | 10/2002 | Garrett | H04L 43/0876 709/224 |
| 2003/0061260 A1 | 3/2003 | Rajkumar | |

(Continued)

OTHER PUBLICATIONS

Karthick, AV. et al. "Optimized Resource Filling Technique for Job Scheduling in Cloud Environment". International Journal of Computer Applications (0975-8887). International Conference on Computing and information Technology (IC2IT-2013).

(Continued)

*Primary Examiner* — Brian Whipple
(74) *Attorney, Agent, or Firm* — John W. Hayes; William H. Hartwell

(57) ABSTRACT

Technology for monitoring all resources and services of a distributed computing environment to collect and store information technology (IT) infrastructure resources, task resource usage metrics, and idle times of the environment. A system management task, both manually created by administrators and automatically scheduled, is queued on a management queue to be processed at a later time. When the system management task is removed from the queue, resources required to execute the activity of the distributed computing environment are then requested. The task is authorized to execute if the requested resources and time to complete the activity are available. The resources are then secured and the system management task executed in the distributed computing environment.

13 Claims, 6 Drawing Sheets

(56) References Cited

U.S. PATENT DOCUMENTS

| | | | |
|---|---|---|---|
| 2004/0249947 A1 | 12/2004 | Novaes et al. | |
| 2006/0190938 A1 | 8/2006 | Capek et al. | |
| 2006/0265712 A1* | 11/2006 | Zhou | G06F 9/5038 718/102 |
| 2007/0234088 A1* | 10/2007 | Marshall | G06F 1/3228 713/320 |
| 2009/0132754 A1* | 5/2009 | Riska | G06F 3/0611 711/103 |
| 2010/0274890 A1* | 10/2010 | Patel | G06F 9/4862 709/224 |
| 2010/0287019 A1* | 11/2010 | Guo | G06F 11/3442 709/224 |
| 2012/0096468 A1 | 4/2012 | Chakravorty et al. | |
| 2012/0304181 A1 | 11/2012 | Jensen et al. | |
| 2013/0247034 A1 | 9/2013 | Messerli | |
| 2015/0236896 A1* | 8/2015 | Brown | H04L 41/0654 709/201 |
| 2015/0236934 A1* | 8/2015 | Huang | G06F 17/30371 709/224 |
| 2015/0271035 A1* | 9/2015 | Colon | H04L 41/142 709/224 |
| 2015/0281016 A1* | 10/2015 | Guerin | H04L 67/1008 709/224 |
| 2016/0134505 A1 | 5/2016 | Crudele et al. | |

OTHER PUBLICATIONS

Xu, Y. and Sekiya, Y. "Scheme of Resource Optimization using VM Migration for Federated Cloud". Proceedings of the Asia-Pacific Advanced Network 2011 v. 32, p. 36-44.

List of IBM Patents or Patent Applications Treated as Related filed on Sep. 4, 2015.

\* cited by examiner

SYSTEM MANAGEMENT AND MAINTENANCE IN A DISTRIBUTED COMPUTING ENVIRONMENT

FIELD OF THE INVENTION

The present invention relates generally to the field of distributed computing, and more particularly to system management and maintenance of distributed computing systems.

BACKGROUND OF THE INVENTION

Distributed computing environments provide users with computational operations, software, data access, storage and network services that do not require end-user knowledge of the physical location and configuration of the system delivering the service. A distributed computing environment typically involves dynamic, secure, and scalable provisioning of virtualized resources such as virtual machines, storage volumes, and networking resources. A virtual machine (VM) is a software-based emulation of a computer which operates based on the computer architecture and functions of a real or physical computer.

Systems management refers to the enterprise wide administration of distributed computing systems. A distributed computing system is a software computing system in which components located on networked computers communicate and coordinate operations by passing data messages. System management may involve hardware inventories, server availability monitoring and metrics, software inventory and installation, anti-virus and anti-malware management, user activity monitoring, capacity monitoring, security management, storage management, and network capacity and utilization monitoring. "System maintenance tasks" are also known. Herein, system maintenance and/or management tasks will be collectively referred to as system management tasks.

SUMMARY

According to an aspect of the present invention, there is a method, computer program product and/or system that performs the following operations (not necessarily in the following order): (i) collecting a first plurality of metrics, with the first plurality of metrics relating to information technology (IT) resources in a distributed computing environment; (ii) collecting a second plurality of metrics, with the second plurality relating to use of services in the distributed computing environment; and (iii) determining a set of relatively-available resources of the distributed computing environment upon which to run a system management task based, at least in part upon the first plurality of metrics and the second plurality of metrics.

DETAILED DESCRIPTION

Embodiments of the present invention recognize that unutilized resources of a distributed computing environment, such as hypervisors, storage, computer processing units, and networks to perform system management activities such as lifecycle management tasks on virtual machine (VM) template images for example. Typical lifecycle management tasks are software and patch installation on VM templates to keep the VM templates up to date when they are instantiated or brought online. These types of activities are expensive to perform in terms of resources. The VM templates must be brought online first before any software updates or patches can be applied, then taken offline again. A distributed computing environment may have thousands of these templates in a public environment. Understanding when the distributed computing environment is not being used to conduct business operations is beneficial to service providers from a system management standpoint. Using the distributed computing environment during idle times for performing maintenance and maintenance tasks can save money for the distributed computing environment provider by not requiring additional resources for management tasks.

Figure 1:
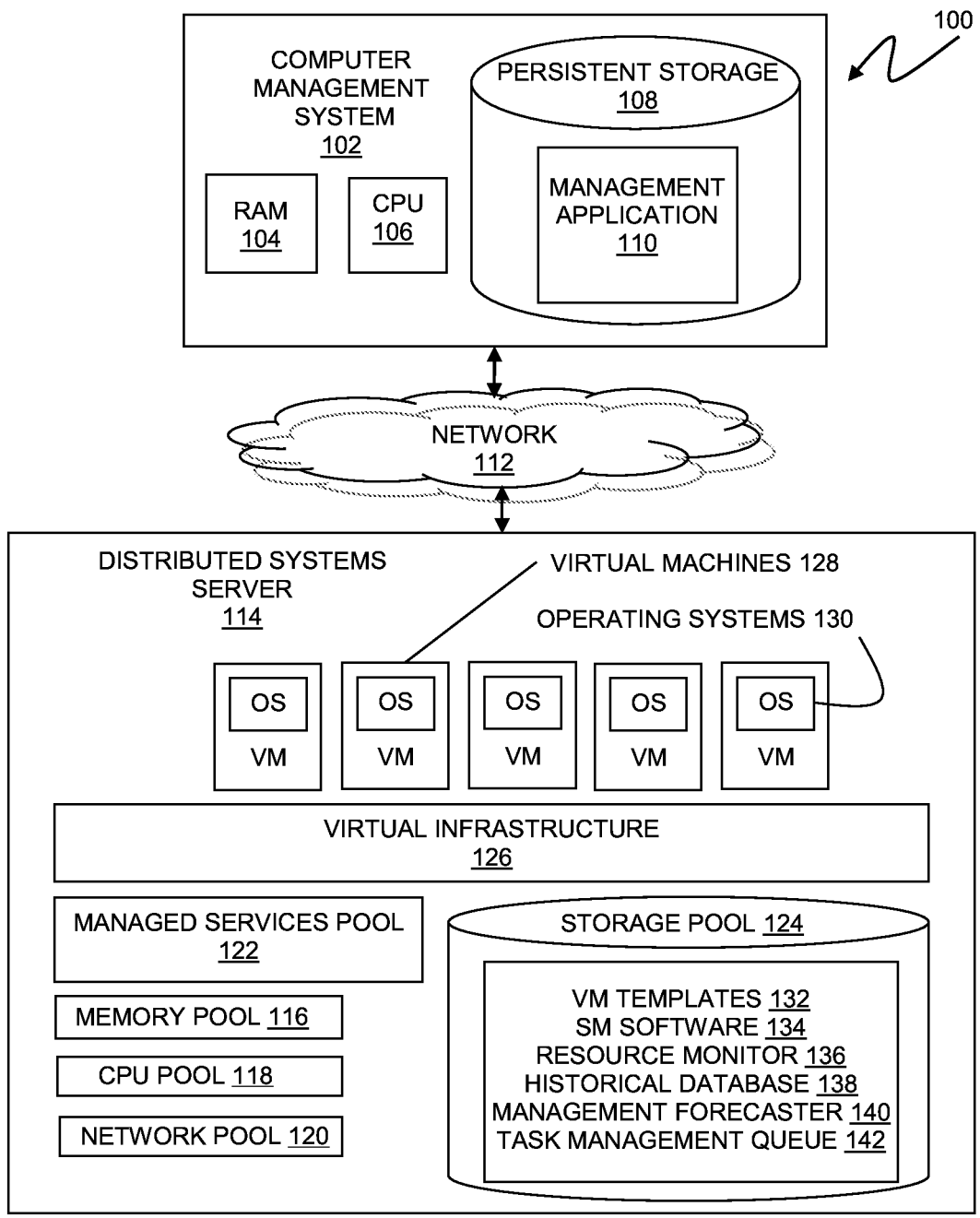
FIG. 1 is a functional block diagram illustrating a distributed computing environment, in an embodiment in accordance with the present invention.

Embodiments in accordance with the present invention will now be described in detail with reference to the Figures. FIG. 1 provides only an illustration of one embodiment and does not imply any limitations with regard to the environments in which different embodiments may be implemented. FIG. 1 is a functional block diagram, generally depicted by the numeral 100, illustrating a distributed computing environment, in an embodiment in accordance with the present invention. Computer management system 102 may be a Web server, or any other electronic device or computing system, capable of processing program instructions and receiving and sending data to system management software 134. Computer management system is a software system hosted on one or more physical or virtual machines in the distributed computing environment 100. In some embodiments, computer management system 102 may be a laptop computer, a tablet computer, a netbook computer, a personal computer (PC), a desktop computer, a personal digital assistant (PDA), a smart phone, or any programmable electronic device capable of communicating with network 112. In other embodiments, computer management system 102 may represent a server computing system utilizing multiple computers as a server system, such as in a distributed computing environment. In general, computer management system 102 is representative of any electronic device or combination of electronic devices capable of executing machine-readable program instructions, as described in greater detail with regard to FIG. 6, in accordance with embodiments of the present invention. Computer management system 102 includes RAM 104, a central processing unit 106, and persistent storage 108.

Persistent storage 108 may, for example, be a hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer-readable storage medium that is capable of storing program instructions or digital information. Management application 110 is stored in persistent storage 108 includes operating system software as well as software that enables computer management system 102 to communicate with users, and other computer systems in the distributed computing environment over network 112. In other embodiments, there may be many computer management systems containing management application 110 on one or more distributed computing environments.

In FIG. 1, network 112 is shown as the interconnecting fabric between computer management system 102 and distributed server 114. In practice, the connection may be any viable data transport network, such as, for example, a LAN or WAN. Network 112 can be, for example, a local area network (LAN), a wide area network (WAN) such as the Internet, or a combination of the two, and include wired, wireless, or fiber optic connections. In general, network 112 can be any combination of connections and protocols that will support communications between computer management system 102 and distributed systems server 114 in accordance with a desired embodiment of the invention.

Distributed systems server 114 may be a management server, a web server, or any other electronic device or computing system capable of receiving and sending data. In some embodiments, distributed systems server 114 may be a laptop computer, a tablet computer, a netbook computer, a personal computer (PC), a desktop computer, a personal digital assistant (PDA), a smart phone, or any programmable device capable of communication with computing computer management system 102 over network 112. In other embodiments, distributed systems server 114 may represent a server computing system utilizing multiple computers as a server system, such as in a distributed computing environment. Distributed systems server 114 also contains memory pool 116, central processing unit (CPU) pool 118, network pool 120, managed services pool 122, storage pool 124, virtual infrastructure 126, virtual machines (VM) 128, and operating systems 130.

Memory pool 116, also known as fixed size block allocation, is the use of pools e.g., dynamic memory allocation for memory management, by pre-allocating a number of memory blocks with the same size called the memory pool. In one embodiment of the present invention, software applications may allocate, access, and free blocks of memory represented with the use of handles during run time processing. CPU pool 118 is a pool of processors that allows sharing of a group of processors between multiple logical and physical computer systems. Network pool 120 is group of undifferentiated networks which are available for use within an environment consisting of network resources such as VLAN IDs, port groups, physical and virtual isolated networks. Managed services pool 122 are outsourced service applications, databases, backup and recovery, data storage, assets, or network management such as a strategic method for improving operations and expenses.

Storage pool 124 is a quantity of storage set aside by an administrator for use by virtual machines. Additional storage may be added to the pool when required. Virtual infrastructure 126 is computer software, firmware or hardware that creates and runs virtual machines. Virtual machines 128 is a software-based emulation of a computer system that operates based on the computer architecture and functions of a real computer system. Operating systems 130 is software that manages computer hardware resources and provides common services for computer programs.

Storage pool 124 also includes virtual machine (VM) templates 132, system management software 134, resource monitor 136, historical database 138, management forecaster 140, and task management queue 142. VM templates 132 are reusable images created from a virtual machine which typically include virtual hardware components, an installed guest operating system with software patches and software applications. System management software 134 is the executor of all manually created and scheduled tasks by automated processes in distributed computing environment 100. In addition, systems management software 134 may make use of software agents installed on systems, such as VMs, of the distributed computing environment 100. Resource monitor 136 is responsible for the collection of resources and services, resource usage level and metrics, and historical data used to perform statistics and analysis to predict idle times in distributed computing environment 100. Historical database 138 is the repository for the collection of resources, resource usage level and metrics, and historical data collected by resource monitor 136. Management forecaster 140 replies to requests from system management software authorizing resources of distributed computing environment 100 to perform requested tasks for a given amount of time. Task management queue 142 is the backlog of management tasks to be performed in distributed computing environment 100.

VM templates 132, system management software 134, resource monitor 136, historical database 138, management forecaster 140, and task management queue 142 can be implemented with any type of storage device that is capable of storing data that may be accessed and utilized by management application 110. In one embodiment, VM templates 132, system management software 134, resource monitor 136, historical database 138, management forecaster 140, and task management queue 142 may reside on distributed systems server 114. In another embodiment, VM templates 132, system management software 134, resource monitor 136, historical database 138, management forecaster 140, and task management queue 142 may reside on computing management system 102 or on other computer systems connected over network 112 in distributed computing environment 100.

Figure 2:
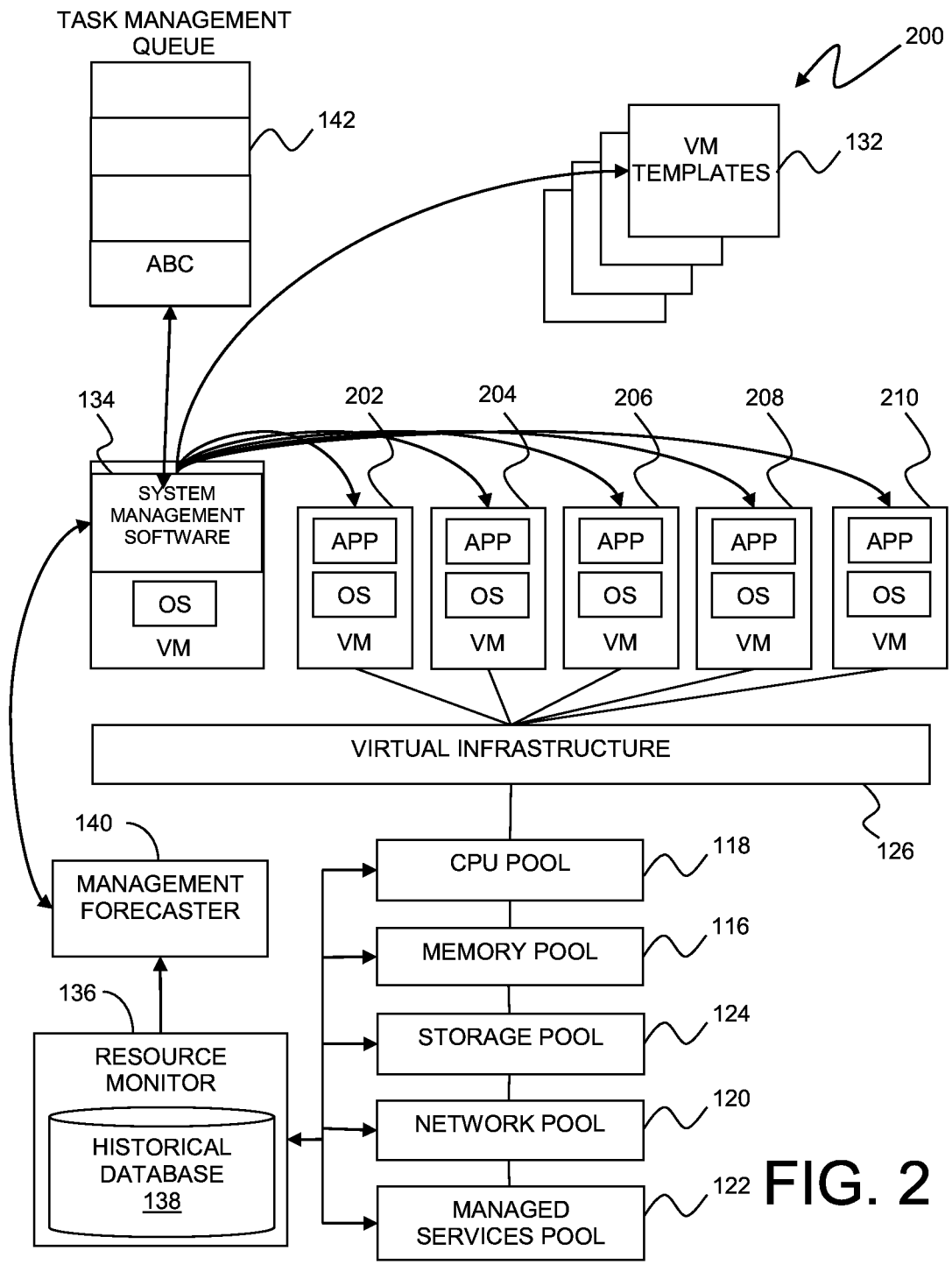
FIG. 2 is a functional block diagram illustrating the task automation, continuous monitoring, and analysis components of a distributed system, in an embodiment in accordance with the present invention.

FIG. 2 is a functional block diagram, generally depicted by the numeral 200, illustrating the task automation, continuous monitoring, and analysis components of a distributed system, in an embodiment in accordance with the present invention. Distributed systems server 114 contains task management queue 142 to temporarily store tasks created by system administrators to perform system management tasks on distributed computing environment 100. Tasks are placed on task management queue 142 by system management software 134. In computer science, a queue is a particular kind of abstract data type or collection in which the entities of the collection are kept in order. In one embodiment, there may be one or more management queues used to store and execute system management tasks. System management software 134 is the executor of the system management tasks created by system administrators. System management software 134 removes the tasks from task management queue 142 and requests the resources and services required to complete the tasks from resource monitor 136. If the resources are available, system management software 134 allocates and reserves the resources, executes the task, then releases the resources back to the distributed computing environment 200. In one embodiment, system management software 134 may execute in a virtual machine such as VM 202 through 210 or on a physical server partition. In other embodiments system management software 134 may reside on a separate computer system in distributed computing environment 100.

Distributed systems server 114 also contains VM templates 132. VM templates 132 are reusable images created from a virtual machine which typically include virtual hardware components, an installed guest operating system with software patches and software applications. VM templates 132 are used when creating a virtual machine such as VM 202 through 210. In one embodiment, VM templates 132 may be contained in a virtual machine or on a physical partition. In other embodiments, VM templates 132 may be contained on a separate computer system in distributed computing environment 100.

Virtual machines VM 202 through 210 are managed by system management software 134 to perform system management tasks on distributed computing environment 100. Resources and time are requested by system management software 134 and used to allocate VM 202 through 210 which execute on virtual infrastructure 126. Virtual infrastructure 126 is computer software, firmware or hardware that creates and runs virtual machines. Management forecaster 140 determines resource availability for resource monitor 136 by examining resource usage metrics of requested tasks in historical database 138. Management forecaster 140 also interacts with system management software 134 granting or restricting resources such as processors from CPU pool 118, memory from memory pool 116, storage from storage pool 124, network bandwidth from network pool 120, and services from managed services pool 122 for requested tasks. In one embodiment, management forecaster 140 may reside in a virtual machine or physical partition in distributed systems server 114. In other embodiments, management forecaster 140 may reside on a computer system the distributed computing environment 100.

Distributed systems server 114 also contains resource monitor 136 which is responsible for collecting usage levels of resources and historical data of the entire distributed computing environment 100 and tasks performed in distributed computing environment 100. When monitoring for the entire distributed computing environment 100, resource monitor 136 collects historical usage of the resource metrics on a short configurable period of time, e.g., 1 minute or 1 hour, on a daily basis. This allows resource monitor 136 to recall resource metrics on a given day and time. For example, resource monitor 136 can be used to analyze a specific resource in distributed computing environment 100 for the first hour in the day on every Monday. Resource monitor 136 also stores the metrics of all resources in distributed computing environment 100 for special events and holidays around the world such as Christmas Day and Thanksgiving.

The mean value and other statistical indicators such as standard deviation of the resource metrics used by a specific task and the mean value of the duration that task took to complete can also be determined by resource monitor 136. For example, resource monitor 136 can be used to collect the resource metrics and the average duration of task "abc" executing in distributed computing environment 100 on a given date range. In one embodiment, resource monitor 136 may be used to identify periods of inactivity and advertise special offers to customers of distributed computing environment 100. In another embodiment, resource monitor 136 may be used to identify recurring periods of intense activity of distributed computing environment 100 to forecast when additional resources will be needed. In another embodiment, resource monitor 136 may reside in a virtual machine such as VM 202 through 210 running on virtual hardware 126. In other embodiments, resource monitor 136 may reside on a computer system located in distributed computing environment 100. Historical database 138 is used to store the collected resource usage levels such as processors from CPU pool 118, memory from memory pool 116 storage from storage pool 124, network bandwidth from network pool 120, and services from managed services pool 122 for requested tasks and historical data of executing tasks in distributed computing environment 100. In one embodiment, historical database 138 may reside in a virtual machine such as VM 202 through 210 running on virtual hardware 126. In other embodiments, historical database 138 may reside on a computer system located in distributed computing environment 100.

CPU pool 118, memory pool 116, storage pool 124, network pool, 120, and managed services pool 122 are all monitored by resource monitor 136 and managed by system management software 134. Management forecaster 140 reports the availability of these resources and system management software 134 allocates and reserves resources from these pools based on the determination of management forecaster 140. In one embodiment, CPU pool 118, memory pool 116, storage pool 124, network pool 120, and managed services pool 122 may be located in a single computer system in distributed computing environment 100. In another embodiment, CPU pool 118, memory pool 116, storage pool 124, network pool 120, and managed services pool 122 may reside in separate computer systems throughout distributed computing environment 100.

Figure 3:
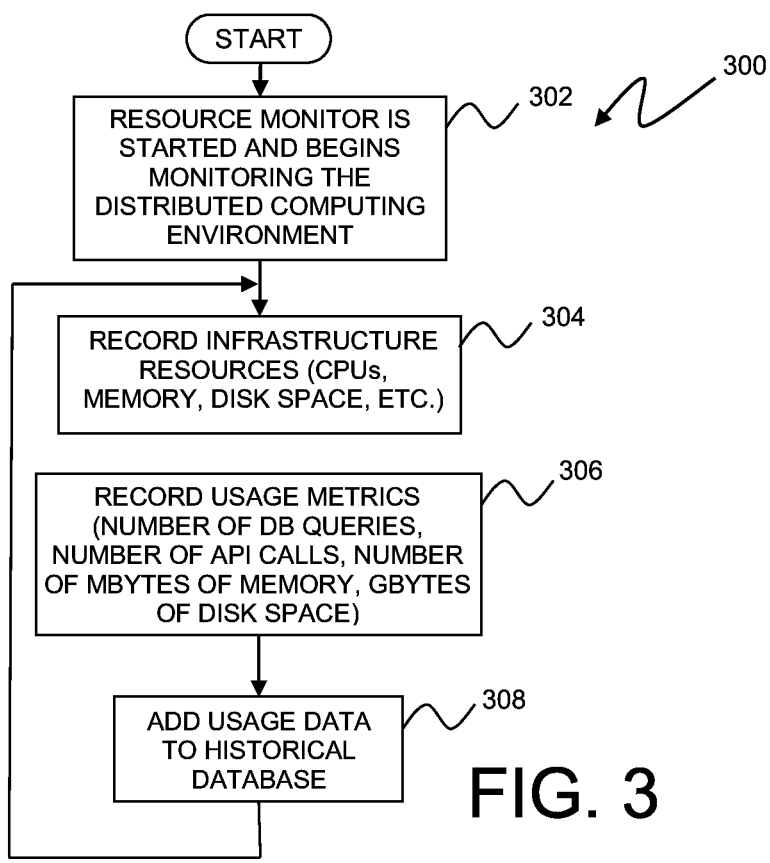
FIG. 3 is a flowchart illustrating the operation steps of monitoring, and analyzing historical usage of resources in the distributed computing environment, in an embodiment in accordance with the present invention.

FIG. 3 is a flowchart, generally depicted by the numeral 300, illustrating the operation steps of monitoring, and analyzing historical usage of resources in the distributed computing environment 100, in an embodiment in accordance with the present invention. In step 302, an instance of resource monitor 136 is started and begins monitoring distributed computing environment 100. In step 304, resource monitor 136 records the infrastructure resources such as number of CPUs, total memory, and disk space and stores the metrics in historical database 138.

In step 306, resource monitor 136 records the resource usage metrics such as the number of database queries, big data transactions, number of application program interface (API) calls, and amount of memory and disk storage used for the executing scheduled tasks or manually initiated user processes. More specifically, monitor 136 collects: (i) a first set of metrics, with the first set of metrics relating to information technology (IT) resources in a distributed computing environment; and (ii) a second set of metrics, with the second set relating to use of services in the distributed computing environment.

In step 308, resource monitor 136 stores the resource usage metrics in historical database 138 to be later used to make forecast decisions by management forecaster 140 or to provide administrators with statistical usage details of distributed computing environment 100. The process is then repeated with resource monitor 136 executing steps 304 through 308 at intervals defined by the administrator of the distributed computing environment 100.

Figure 4:
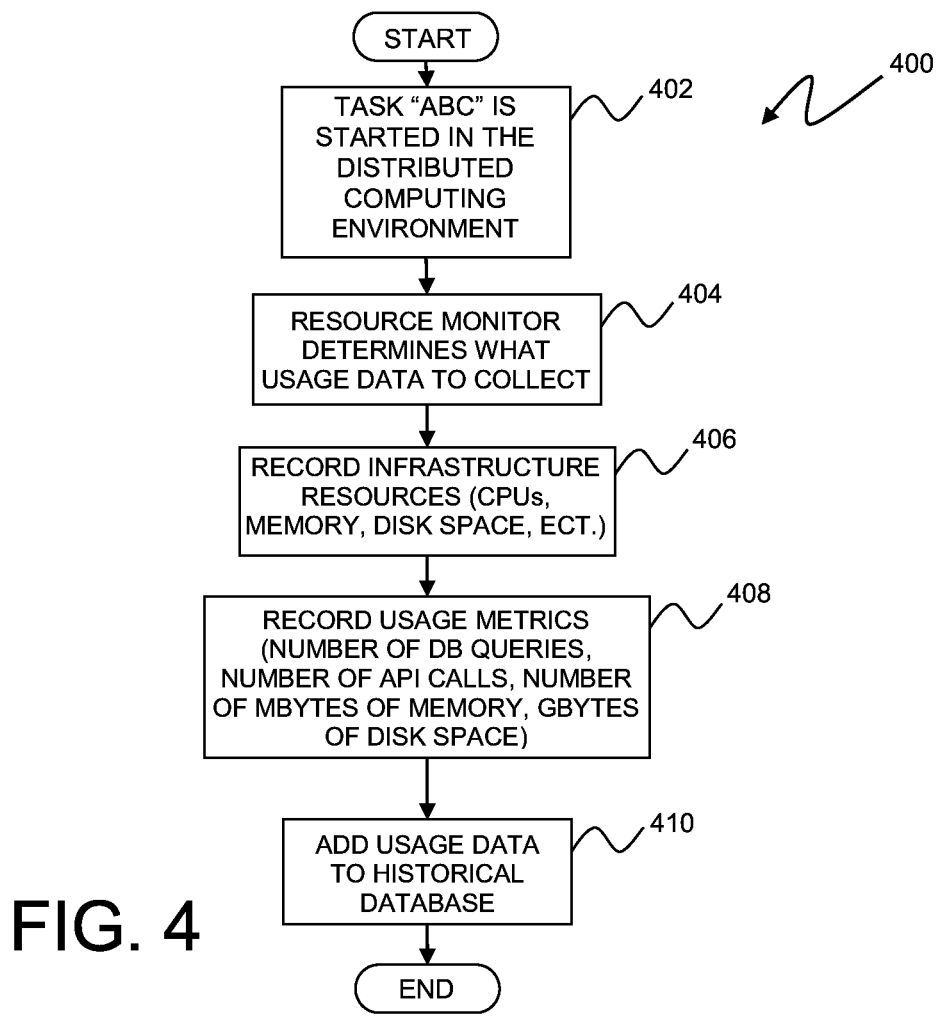
FIG. 4 is a flowchart illustrating the operation steps of the monitoring, and analyses of a registered task in the distributed computing environment, in an embodiment in accordance with the present invention.

FIG. 4 is a flowchart, generally depicted by the numeral 400, illustrating the operation steps of the monitoring, and analyses of a registered task in distributed computing environment 100, in an embodiment in accordance with the present invention. In step 402, a task is registered with resource monitor 136 to execute in distributed computing environment 100. In step 404, resource monitor 136 collects the infrastructure resource metrics such as number of CPUs used, total memory used, and disk space used by the executing task. In step 406, resource monitor 136 records the infrastructure resources such as number of CPUs, total memory, and disk space used by the task. In step 408, resource monitor 136 records the infrastructure resource metrics such as number of CPUs used, total memory used, and disk space used by the executing task. In step 410, resource monitor 136 stores the resource usage metrics in historical database 138 to be later used to make forecast decisions by management forecaster 140 or to provide administrators with statistical usage details of distributed computing environment 100.

Figure 5:
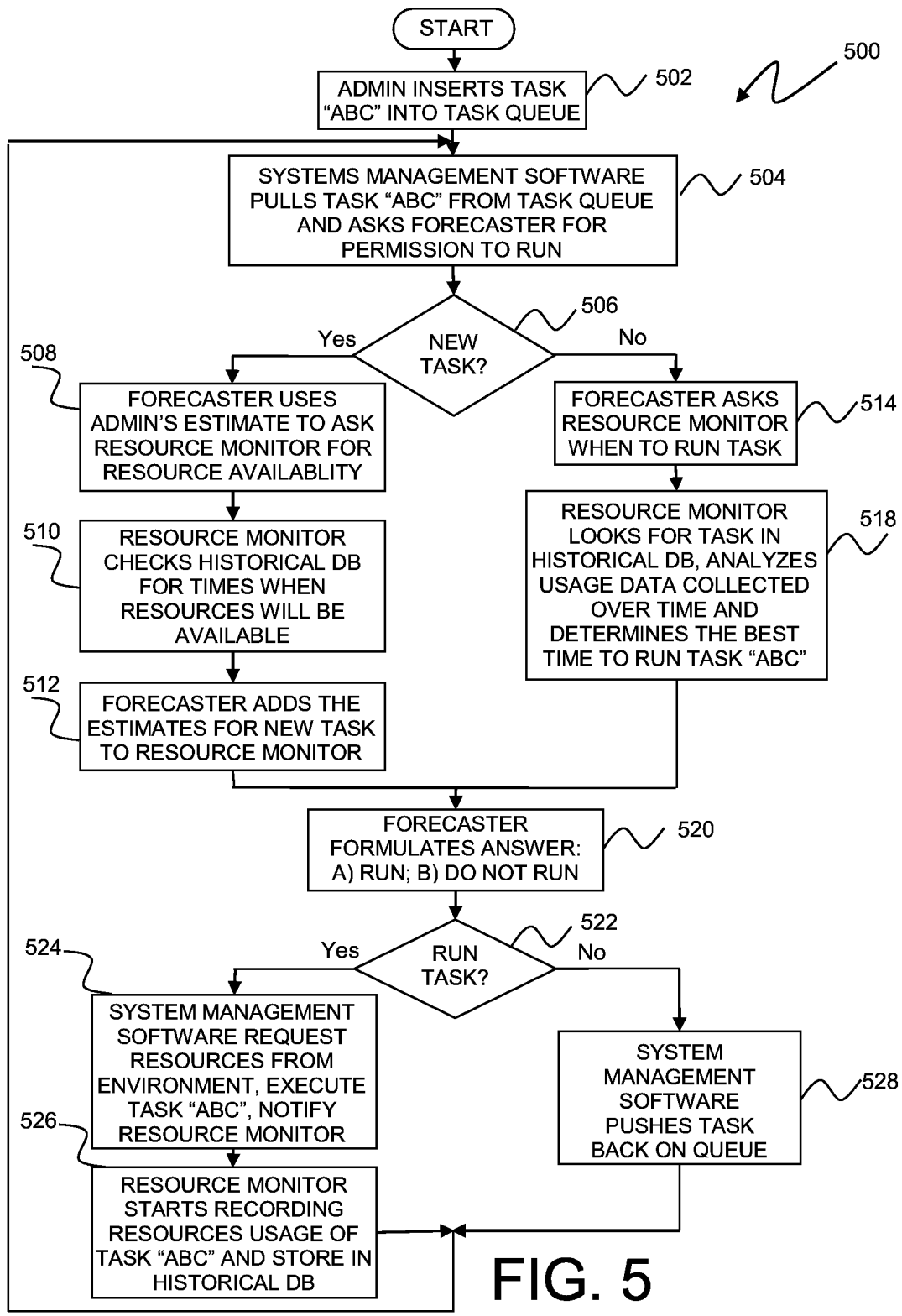
FIG. 5 is a flowchart illustrating operational steps of the task automation, continuous monitoring, and analyses of a distributed computing environment, in an embodiment in accordance with the present invention.

FIG. 5 is a flowchart, generally depicted by the numeral 500, illustrating operational steps of the task automation, continuous monitoring, and analyses of distributed computing environment 100, in an embodiment in accordance with the present invention. Generally speaking, flowchart 500 sets forth a method for determining a set of relatively-available resources of the distributed computing environment upon which to run a system management task based, at least in part, upon the service-related and resource-related metrics discussed above.

In step 502, an administrator of distributed computing environment 100 creates task "abc" and inserts the task to task management queue 142. In step 504, system management software 134 removes task "abc" from task management queue 142 and requests permission to execute the task from management forecaster 140. In decision step 506, management forecaster 140 determines if task "abc" has been executed by system management software 134 previously. If task "abc" is new ("yes" branch, decision 506), management forecaster 140 uses the administrators time estimate to request resource availability from resource monitor 136 as depicted in step 508. In step 510, resource monitor 136 checks historical database 138 for available times when resources of distributed computing environment 100 may be available to execute task "abc". Resource monitor 136 makes this determination by examining the past idle times of distributed computing environment 100 stored in historical database 138. In step 512, management forecaster 140 registers the new task "abc" with resource monitor 136 so that historical data will be collected for task "abc" when task "abc" is executed again in the future.

If task "abc" has been executed before ("no" branch, decision 506), management forecaster 140 requests resource availability from resource monitor 136 as depicted in step 514. In step 518, resource monitor 136 checks historical database 138 for available times when resources of distributed computing environment 100 may be available by analyzing usage data collected over time. In step 520, management forecaster 140 formulates the answer to whether task "abc" should be authorized to run on distributed computing environment 100 based on results gathered by resource monitor 136 in historical database 138. In decision step 522, system management software 134 determines to run task "abc" based on the result from management forecaster 140 in step 520. If task "abc" is authorized to run ("yes" branch, decision 522), system management software 134 requests the required resources to complete the task from resource monitor 136 as depicted in step 524. In step 526, resource monitor 136 begins recording the resource usage and metrics of task "abc" and stores them in historical database 138 as described in greater detail with regard to FIG. 4. If task "abc" is not authorized to execute ("no" branch, decision 522), system management software 134 pushes task "abc" back on task management queue 142 in step 528. The process is then repeated with system management software 134, management forecaster 140, and resource monitor 136 executing steps 504 through 528 continuously.

Figure 6:
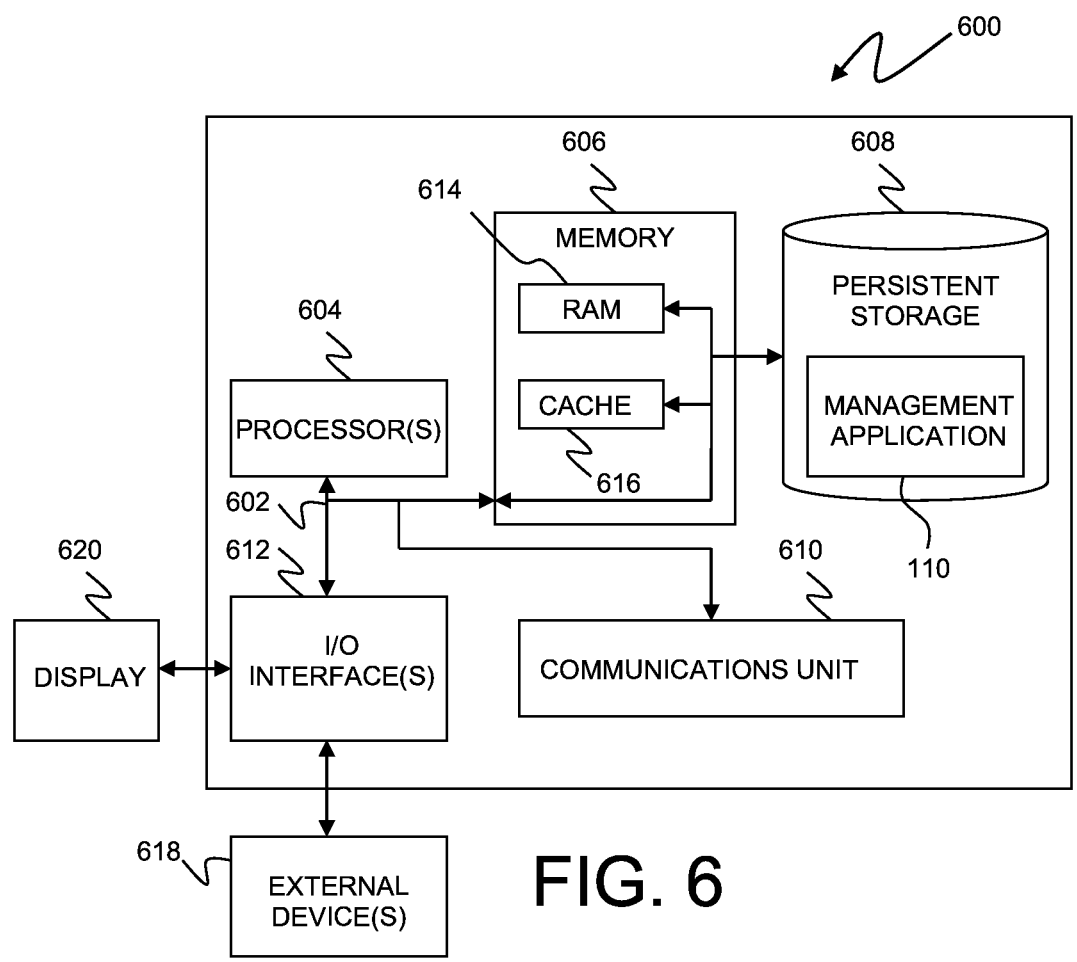
FIG. 6 depicts a block diagram of components of the computer management system in an embodiment in accordance with the present invention.

FIG. 6 depicts a block diagram of components of the computer management system 600 in an illustrative embodiment in accordance with the present invention. It should be appreciated that FIG. 6 provides only an illustration of one implementation and does not imply any limitations with regard to the environments in which different embodiments may be implemented. Many modifications to the depicted environment may be made.

Computer management system 102 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Management application 110 is stored in persistent storage 608 for execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of network 112 and distributed systems server 114. In these examples, communications unit 610 includes one or more network interface cards. Communications unit 610 may provide communications through the use of either or both physical and wireless communications links. Management application 110 may be downloaded to persistent storage 608 through communications unit 610.

I/O interface(s) 612 allows for input and output of data with other devices that may be connected to computer management system 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., management application 110, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor. The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising a computer readable storage medium having stored thereon:
    program instructions to collect a first plurality of metrics, with the first plurality of metrics relating to historical usage of information technology (IT) resources in a distributed computing environment;
    program instructions to collect a second plurality of metrics, with the second plurality relating to historical usage of services in the distributed computing environment;
    program instructions to store a system management task on a task management queue to be executed at a later time in the distributed computing environment; and
    program instructions to determine a set of relatively-available resources of the distributed computing environment upon which to run a system management task based, at least in part upon the first plurality of metrics and the second plurality of metrics, wherein the set of relatively-available resources is available at an idle time during which the distributed computing environment does not require additional resources to conduct business operations.

2. The computer program product of claim 1 wherein:
    the first plurality of metrics includes at least one metric related to each of the following areas: processing power and storage capacity; and
    the second plurality of metrics includes at least one metric related to each of the following areas: database queries and software updates.

3. The computer program product of claim 1 wherein:
    the distributed computing environment includes at least a first cloud and second cloud; and
    the second plurality of metrics includes at least one metric that relates to data transactions where the first cloud accesses the second cloud.

4. The computer program product of claim 1 wherein the system management task is a cloud maintenance job.

5. The computer program product of claim 1 wherein the computer readable storage medium further has stored thereon:
    program instructions to run the system management task on the relatively-available set of resources.

6. The computer program product of claim 1 wherein the computer readable storage medium further has stored thereon:
    program instructions to monitor consumption of IT resources by the running of the system management task to determine a set of IT resource consumption value(s) associated with the system management task; and
    program instructions to monitor consumption of services by the running of the system management task to determine a set of service consumption value(s) associated with the system management task.

7. The computer program product of claim 6 further comprising:
    program instructions to communicate in human understandable and/or machine readable form at least one of the following: the set of service consumption value(s), and the set of IT resource consumption value(s).

8. A computer system comprising:
    a processor(s) set; and
    a computer readable storage medium;
    wherein:
    the processor set is structured, located, connected and/or programmed to run program instructions stored on the computer readable storage medium; and
    the program instructions include:
    program instructions to collect a first plurality of metrics, with the first plurality of metrics relating to historical usage of information technology (IT) resources in a distributed computing environment;
    program instructions to collect a second plurality of metrics, with the second plurality relating to historical usage of services in the distributed computing environment;
    program instructions to store a system management task on a task management queue to be executed at a later time in the distributed computing environment; and
    program instructions to determine a set of relatively-available resources of the distributed computing environment upon which to run a system management task based, at least in part upon the first plurality of metrics and the second plurality of metrics, wherein the set of relatively-available resources is available at an idle time during which the distributed computing environment does not require additional resources to conduct business operations.

9. The system of claim 8 wherein:
    the first plurality of metrics includes at least one metric related to each of the following areas: processing power and storage capacity; and
    the second plurality of metrics includes at least one metric related to each of the following areas: database queries and software updates.

10. The system of claim 8 wherein:
    the distributed computing environment includes at least a first cloud and second cloud; and
    the second plurality of metrics includes at least one metric that relates to data transactions where the first cloud accesses the second cloud.

11. The system of claim 8 wherein the system management task is a cloud maintenance job.

12. The system of claim 8 wherein the computer readable storage medium further has stored thereon:
    program instructions to run the system management task on the relatively-available set of resources.

13. The system of claim 8 wherein the computer readable storage medium further has stored thereon:
    program instructions to monitor consumption of IT resources by the running of the system management task to determine a set of IT resource consumption value(s) associated with the system management task; and
    program instructions to monitor consumption of services by the running of the system management task to determine a set of service consumption value(s) associated with the system management task; and program instructions to communicate in human understandable and/or machine readable form at least one of the following: the set of service consumption value(s), and the set of IT resource consumption value(s).

\* \* \* \* \*